May 12, 1959

J. L. PATTON ET AL 2,886,517

METHOD AND APPARATUS FOR CATALYTIC REACTIONS

Filed May 6, 1954

INVENTORS
JAMES L. PATTON
VICTOR K. TOCK
BY *S. H. Palmer*
*V. F. Darris*
ATTORNEYS

INVENTORS
JAMES L. PATTON
VICTOR K. TOCK
BY
ATTORNEYS

United States Patent Office 2,886,517
Patented May 12, 1959

2,886,517
METHOD AND APPARATUS FOR CATALYTIC REACTIONS

James L. Patton, Ramsey, and Victor K. Tock, River Edge, N.J., assignors to M. W. Kellogg Company, Jersey City, N.J., a corporation of Delaware Application May 6, 1954, Serial No. 427,995

16 Claims. (Cl. 208—134)

The present invention relates to catalytic reactions and more particularly to catalytic reactions in which the reactant material stream flows through a fixed bed of subdivided catalyst or contact material, which has a comparatively low resistance to the flow of the reactant stream therethrough.

It is highly important for high operating efficiency to be realized in catalytic processes such as reforming of light hydrocarbon oil, for example naphtha, to a high quality gasoline material, that the entire catalyst bed be utilized to a high degree and that substantially all increments of the reactants be subjected to substantially the same conditions for substantially the same time interval while in contact with the catalyst. To achieve this end it is necessary that the paths of all increments of the reactant stream through the catalyst bed be of substantially the same length and that the pressure conditions along all of said paths be substantially the same. With the low flow resistance beds of the prior art these desiderata are well nigh impossible of attainment, as in such low resistance beds channeling of the reactant stream through localized areas of the catalyst bed and the bypassing of large masses of the catalyst are the rule rather than the exception.

It is a principal object of this invention to provide a novel method for conducting catalytic reactions, and novel apparatus for carrying the method out in practice, in which the reactant material is passed at reaction temperature and pressure through a fixed bed of catalyst along paths of substantially equal length and flow resistance, said paths encompassing substantially the whole of said bed, the flow volumes of said paths decreasing progressively whereby to effect flow equalization of the reactant materials through all sections of the catalyst within said bed.

It is a further principal object of this invention to provide a novel method of conducting catalytic reactions, and novel apparatus for carrying out the method in practice, in which the reactant material at reaction temperature and pressure is passed into a reaction zone to substantially completely envelop the external peripheral surface of a fixed bed of catalyst of circular cross section in said reaction zone and to impose on said external peripheral surface a substantially equal pressure throughout the full extent thereof, and in which said reactant material flows through said bed from said peripheral surface to a central outlet in said bed, said central outlet arranged that all portions of the reactant material flow through paths of substantially equal length, said bed of such density and said paths of such length that the pressure drop in said reactant material in flowing from said peripheral surface to said outlet is small relative to the inlet pressure of said reactant material.

It is a still further principal object of this invention to provide a method, and apparatus for carrying out the method in practice, for conducting the catalytic reformation of light hydrocarbon oil to a high quality gasoline material in which the hydrocarbon oil at reaction pressure and temperature is passed through a fixed bed of catalyst along paths of substantially equal length and flow resistance, said paths distributed substantially uniformly throughout the whole of said bed, the flow resistance of said paths increasing progressively whereby to effect flow equalization through all sections of the catalyst within said bed.

The further features, objects, and advantages of this invention will become apparent from a consideration of the following detailed description taken with the accompanying drawings in which.

Figure 1:
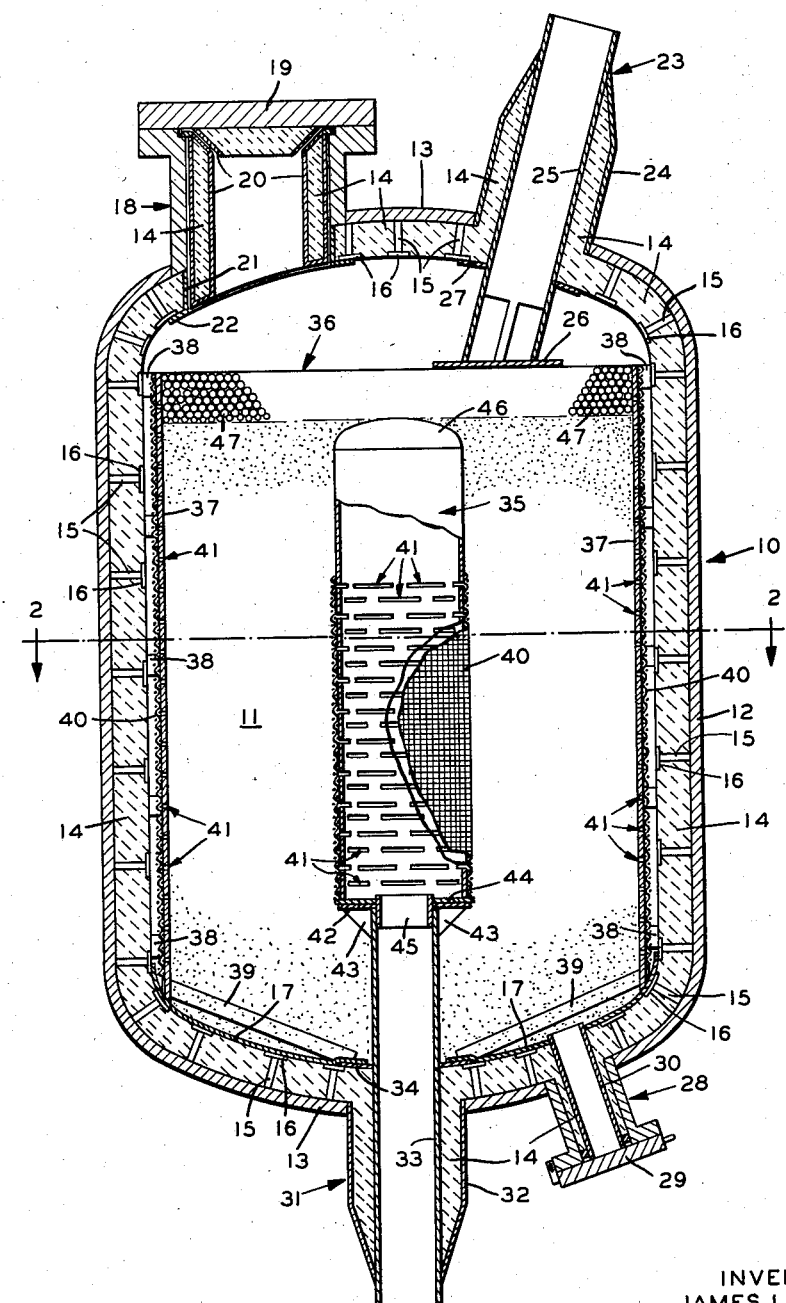
Fig. 1 is a vertical section through a reactor vessel embodying the novel apparatus features of the invention.
Figure 2:
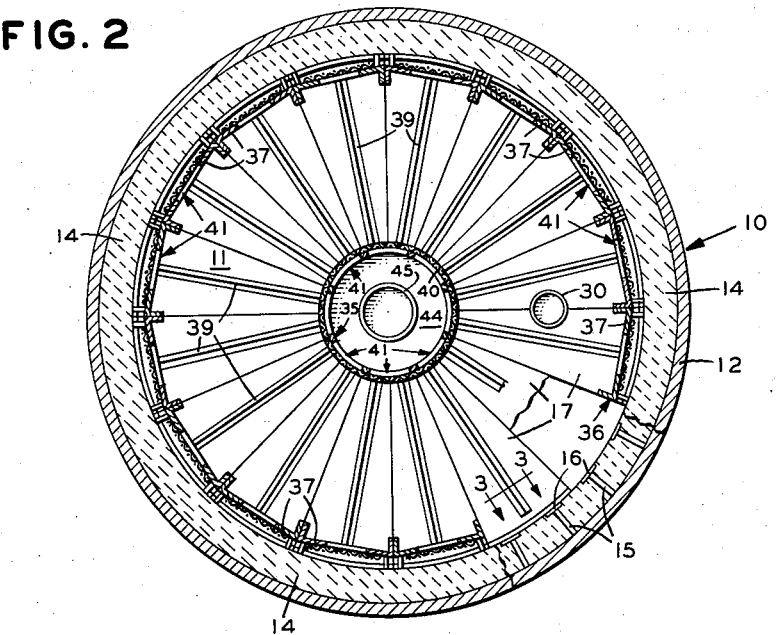
Fig. 2 is a section taken on line 2—2 of Fig. 1 with parts broken away to better show construction details.
Figure 4:
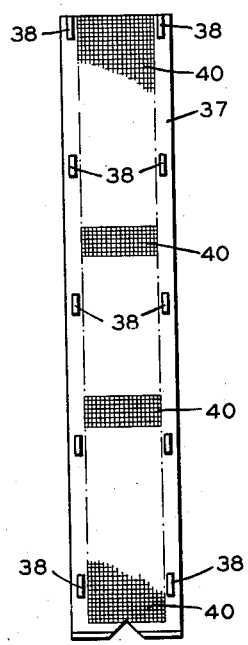
Fig. 4 is a front view of a basket section.
Figure 5:
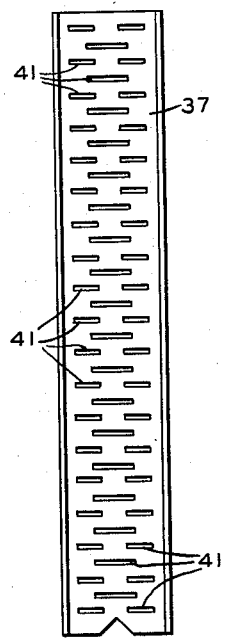
Fig. 5 is a back view of the basket section of Fig. 4.
Figure 3:
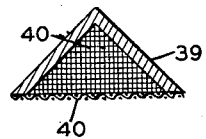
Fig. 3 is a section taken on line 3—3 of Fig. 2.

In the reaction zone of the present invention the incoming reactant stream is substantially uniformly distributed over substantially the whole peripheral surface of the catalyst bed therein. The catalyst bed is of circular cross section and is of such density as to effect a comparatively low drop in the pressure of the reactant material flowing therethrough. The flow of the reactant material is radial through the catalyst bed to a central outlet therein located and arranged to assure flow paths of substantially equal lengths from all points on said peripheral surface. The radial flow of the reactant material results in an increased resistance to flow as the reactant streams move toward the central outlet of the bed and a high pressure drop area is set up near said central outlet which results in equalization of flow rates through all parts of the bed. A large peripheral surface of the catalyst bed is exposed to inflowing reactant material, this not only provides for uniform distribution of the incoming reactant material but also the uniform distribution over the whole of said peripheral surface of any particles of dirt or any other foreign matter which tend to seal said peripheral surface to the entrance of reactant material so that the sealing effects of said dirt or foreign matter are materially minimized. All parts of the inner surface of the vessel defining the reaction zone are maintained at the reactant material inlet pressure so that the possibility of the reactant material feed bypassing the catalyst bed is effectively removed.

The novel method and apparatus of the invention possess numerous advantages and have a wide field of utility. In general they are applicable to chemical reactions in which reactant material is contacted with a fixed bed of catalyst or contact material and are especially useful in a variety of hydrocarbon conversion reactions particularly those in which the hydrogen-carbon ratio is altered. Among the numerous reactions for which the novel method and apparatus of the invention are indicated as of utility are dehydrogenation, hydrogenation, hydrogenolysis, cracking, hydrocracking, isomerization, oxidation, aromatization, cyclization, hydrodesulfurization, hydrocarbon synthesis, dealkylation, hydrodechlorination, dehydroxylation, alkylation, polymerization and hydrogen exchange systems. In general these reactions may be carried out under conventional reaction conditions of temperature, pressure, etc. with a wide variety of catalysts.

The apparatus and the method of the present invention are especially adapted to the upgrading of light hydrocarbon oils, for example gasoline, naphtha, and kerosene, for the production of high quality gasoline. The catalyst used in the reforming process has the properties of being able to hydrogenate and dehydrogenate hydrocarbon materials. The materials of the stated catalytic properties are well known and include, for example, compounds of the left-hand elements of group VI, more particularly, the oxides and/or sulfides of such group VI metals either alone or in combination with a compound, more particularly the sulfides and/or oxides, of a group VIII metal, for example nickel, having an atomic number not greater than 18. The noble metals platinum and palladium form another very important class of catalyst which is useful for this purpose. The noble metal may be used alone or may be supported, as for instance, on alumina in a fresh or spent form. Specific examples of the catalyst are tungsten sulfide-alumina, molybdenum trioxide-alumina, chromia-alumina, cobalt molybdate-alumina, nickel tungstate-alumina, platinum-alumina, palladium-alumina, etc.

The catalyst element comprises about 0.01% to about 25% by weight of the total catalyst, more usually, about 1 to 12% by weight on the same basis. In the case of the catalyst containing two catalytic elements, the group VI compound can be present in the amount indicated and the second catalytic element, the group VIII compound can be present in the amount of about 1.0% to about 15% by weight based on the total amount of catalyst. The support material for the catalytic element can be any known carrier, as for example, silica, silica-alumina, kieselguhr, pumice, silica-magnesia, etc. When the noble metals are employed, the noble metal is present in the catalyst in the amount of about 0.01% to 5%, but more usually about 0.1% to 2% based on the total weight of catalyst. Alumina is an excellent support for the noble metal catalyst although from about 1% to 12% by weight of silica stabilizes the alumina at elevated temperatures.

In the reforming of light hydrocarbon oils, for example, gasoline, naphthene, and kerosene, for the production of a high quality gasoline, a supported platinum catalyst is employed and the reaction temperature is about 700° F. to about 1075° F.; more usually, the range is between 800° F. and 950° F. At the temperature specified, the reaction pressure may be varied over a wide range including pressures of about 25 to 1000 p.s.i.g., more usually, 100 to 700 p.s.i.g. The quantity of oil feed which is processed relative to the quantity of catalyst used is measured in terms of the weight space velocity, that is, the pounds of the oil feed charged to the reaction zone on an hourly basis per pound of catalyst present in said zone. In general, the weight space velocity can be varied from .05 to 10 $W_0/hr./W_c$, more usually, about .25 to about 5 $W_0/hr./W_c$. When the reaction is conducted in the presence of added hydrogen, the hydrogen charge to the process is measured in terms of the standard cubic foot, 60° F. 760 mm. of Hg, of oil feed which is conveniently abbreviated to s.c.f.b. The hydrogen serves to suppress carbon formation and in general it is charged to the reaction zone at a rate of from about 500 to 15,000 s.c.f.b. or, more usually, from 1000 to about 7500 s.c.f.b.

Referring now to the drawings: The reactor 10 houses the catalyst bed 11 and defines the reaction zone. The reactor 10 is formed of a cylindrical body section 12 whose ends are closed by the top and bottom dished heads 13. The reactor 10 is provided with an internal lining 14 of refractory insulation material which covers substantially the whole of the internal surface thereof. The material of the lining 14 is preferably a settable refractory, high temperature cement and is applied in the conventional manner by means of a conventional pneumatic spray "gun" arrangement. As an aid in depositing a refractory lining 14 of substantially uniform predetermined thickness and in holding the lining 14 in position after it is deposited, the bolts 15 and washers 16 are provided. The bolts 15 are of substantially uniform length and are welded to the wall of the reactor 10 and to the washers 16, preferably made of corrosion resistant alloy. The portion of the refractory lining 14 on the bottom head 13 of the reactor 10 is covered by comparatively thin lining 17 of corrosion resistant alloy. The alloy lining 17 is formed of strips of a width small enough to enter the reactor 10 through the manway 18 provided in the upper head 13. The manway 18 affords entrance into the reactor 10 for assembly and maintenance of the internal structure thereof and introduction thereinto of the catalyst bed. The manway 18 is normally closed by a cover 19, bolted or otherwise removably united thereto. The manway 18 and the cover 19 are also internally covered with a refractory lining 14. Thin alloy metal members 20 are employed to hold the refractory lining 14 of the manway 18 and its cover 19 in position and protect said lining 14. A sleeve 21 is united to the manway 18 and covers the hole in the main lining 14 through which the lining 14 of the manway 18 extends. The lining at this hole is further reinforced and protected by the washer ring 22 which surrounds the inside end of the sleeve 21 and is united thereto. The top head 13 also includes an entrance nozzle 23 through which the reactant material is introduced into the reaction zone. The nozzle 23 includes an outer section 24 and an inner section 25. The outer section 24 has a cylindrical portion which is attached, as by welding, to the periphery of the hole in the wall of the upper head 13 and a frusto-conical portion whose smaller end is welded to the tubular inner section 25. The inner section 25 extends inwardly of the reactor 10. The inner end of the section 25 is castellated and has united thereto a distributor baffle 26. By this arrangement the incoming reactant materials are distributed more or less uniformly over the whole cross section of the reactor 10 and do not impinge on a restricted area of the catalyst bed 11. The space between the sections 24 and 25 is filled with insulation material 14. The inner section 25 also carries a washer ring 27 united thereto which bears against the surface of the insulation material 14 adjacent the opening in the wall of the head 13 and serves to reinforce said insulation and to give the inlet nozzle 23 the required stability and rigidity. The construction is such that if due to wear, whether corrosive or erosive, of the inner section 25, said section 25 may be easily removed and replaced.

The bottom head 13 has a plurality of catalyst drop nozzles 28 extending therefrom through which the catalyst may be removed from the reactor 10, only one nozzle 28 is shown. The catalyst drop nozzle 28 is normally closed by a cover 29 which is shown as hinged but may be removably united thereto in any preferred manner. The catalyst drop nozzle 28 includes an internal alloy lining sleeve 30 spaced therefrom to provide an annular space for the accommodation of refractory insulation lining 14. The inner end of the sleeve 30 is united to the alloy lining 17 which covers the insulation 14 on the bottom head 13. A reactant material outlet connection 31 extends from the center of the bottom head 13. The connection 31 includes an outer section 32 made up of a cylindrical portion which is united to the bottom head 13 and a frusto-conical portion whose smaller end is united to the inner tubular section 33. The annular space between the sections 32 and 33 is filled with refractory insulation lining 14. The tubular inner section 33 is united to a ring washer 34 on the lining 14 and extends inwardly to carry at its upper end the cylindrical member 35 which forms the outlet of the reaction zone. The alloy lining 17 overlies the ring washer 34 and has a hole therein larger than the inner section 33, through which said section passes.

Spaced inwardly of the insulation lining 14 and substantially concentric with the body section 12 is positioned a catalyst supporting basket 36 which is made up of a plurality of alloy channel sections 37 whose adjacent flanges are bolted or otherwise removably united. All portions of the catalyst basket structure 36 are maintained at a predetermined spacing from the respective adjacent surface of the insulation lining 14, to thereby make possible the maintenance of substantially uniform pressure conditions over the full extent of the surface of the basket structure 36 by means of a plurality of spacing elements 38 united to each of the channel sections 37 and distributed along the length thereof. The bottom edges of the channel sections 37 bear on the sheet alloy lining 17 and are notched to accommodate the radially outer end of the angle members 39 which are distributed radially on said alloy lining 17 to define inlets for the reactant material into the bottom of the catalyst bed 11. For this result both of the ends of the angles 39 and the open portions intermediate said ends are covered with one or more thicknesses of wire cloth 40. The wire cloth 40 is of such mesh as to prevent the passage of the catalyst therethrough without imposing substantial resistance to the flow of the reactants therethrough. If a plurality of layers of wire cloth 40 are employed, the various layers are of graded mesh size. With this arrangement the reactant material enters the outer ends of the angle members 39 from the space between the insulation lining 14 and the catalyst supporting basket 36 to flow inwardly along said angles 39 and to progressively leave said angles 39 through the wire cloth 40 along their length and at the inner end thereof to enter the catalyst bed. The resistance to flow through the angles 39 is quite small so that the reactant material as it leaves the angles 39 and enters the bottom of the catalyst bed 11 is at substantially the same pressure as that in the annular space between the catalyst basket 36 and the insulation lining 14. The channel sections 37 are provided with slotted holes 41 which are distributed substantially uniformly over the full length thereof to permit the flow of reactant material therethrough. To prevent the passage of catalyst through the slotted holes 41 one or more thicknesses of the wire cloth 40 are interposed adjacent the outer surface of the channel members 37 or, if preferred, adjacent the inner surface of said members.

The inner section 33 of the outlet connection 31 carries an annular member 42 at its inner end, the connection between the section 33 and the annular member 42 is preferably reinforced by means of a plurality of radially distributed gussets 43. The cylindrical outlet member 35 has an annular member 44 attached to its lower end which is adapted to seat on the annular member 42. A short sleeve or nipple 45 is attached to the inner periphery of the annular member 44 and is of such a size as to telescope with limited clearance with the top end of the inner section 33 so as to maintain the cylindrical outlet member 35 in a predetermined positional relation relative to catalyst basket structure 36. The upper end of the outlet member 35 is closed by a dome-like cap 46 integrally united thereto.

The intermediate and the lower portions of the cylindrical outlet member 35 are perforated by the slotted holes 41 which are distributed substantially uniformly throughout the extent thereof to provide parts through which the reacted product may leave the catalyst bed 11. The slotted portion of the cylindrical outlet member 35 is so proportioned and arranged that the flow paths through the catalyst bed 11 from any portion of the outer peripheral surface thereof are substantially of equal length. The outer surface of the slotted portion of the cylindrical outlet member 35 is also covered with one or more thicknesses of the wire cloth 40 to prevent movement of the catalyst into product outflow. The unslotted upper portion of the cylindrical outlet member 35 is of substantially the same length as the portion of the inner section 33 within the reactor 10. The internal space of the catalyst basket structure 36 is filled with catalyst of preferred composition and character substantially to the level of the top of the dome cap 46, the remainder of the space above said level is filled with inert material, as for instance, alumina or Alundum, in coarsely subdivided form to assure free access of the reactant material to the upper surface of the catalyst bed 11 for entrance thereinto. It is at present preferred to employ Alundum balls as the inert subdivided material 47, these balls ranging in size from ½ inch to 1 inch. It is also preferred to form the bed of inert material 47 of a plurality of graded layers of progressively decreasing size.

It is seen that the entering reactant material is in open contact with the top and bottom outer surfaces as well as the side surfaces of the catalyst bed 11 and is free to enter at all portions of the said outer surfaces for flow therethrough to the slotted holes 41 in the cylindrical outlet member 35 and in so doing all possible paths that the reactants may take are of substantially the same length and of equal flow resistance. It is to be noted that in this arrangement any extraneous material such as dirt and the like which tends to seal the surface of the catalyst bed 11 to the entrance of the reactant material will be distributed over the whole of said outer surfaces of the catalyst bed 11 and will therefore have only a minor effect at best. It is also to be noted that the resistance of the flow paths increases proportionately as the slotted holes 41 in the cylindrical member 35 are approached, so that adjacent said member 35, an area of increased pressure drop is produced so that flow through the various sections of the catalyst is automatically adjusted.

Having provided a description of the present invention, reference will now be had to a specific example in order to obtain a fuller understanding thereof.

In reforming naphtha in the presence of hydrogen in accordance with the novel method and in the novel apparatus of the invention, a naphtha of a gravity of about 52° A.P.I. and an octane rating of 30 C.F.R.R. clear and having an I.B.P. of 185° F. and an E.P. of 390° F. (A.S.T.M. distillation), together with the necessary hydrogen, is heated in conventional apparatus to a temperature of about 900° F. and at a pressure of about 500 p.s.i.g. The hydrogen is supplied at the rate of about 5000 s.c.f.b. The heated reactant stream is passed to the inlet nozzle 23 as required to provide a weight space velocity of about 4.0 $W_0$/hr./$W_c$.

The catalyst bed 11 is composed of a platinum catalyst which includes about 0.5% of platinum, based on the total weight of catalyst, supported on alumina to which has been added about 2% by weight of silica to stabilize the alumina at elevated temperatures. The catalyst is in the form of short, approximately cylindrical pieces of a diameter of about 1/16" and of a length ranging from about 1/8" to about 1/2".

The reactant material flows to all portions of the space surrounding the catalyst bed 11 and distributes itself at the same pressure over the whole external surface of the catalyst bed 11, the top and bottom surface as well as the outer cylindrical peripheral surface. The reactant material flows from all points of the external surface of the catalyst bed 11 to the slotted holes 41 of the cylindrical member 35. All portions of the reactant material receive substantially identical treatment in the catalyst bed 11 as they travel along paths of substantially the same length under substantially the same temperature and pressure conditions, conversely substantially the whole of the mass of catalyst in the catalyst bed 11 is in contact with the reactant materials and no substantial portion thereof is bypassed. It is to be particularly noted that if due to packing, loss, etc., the volume of the catalyst of the bed 11 decreases and the level of the bed 11 drops, the inert material 47 moves down with the catalyst and uninterruptedly continues its catalyst covering and reactant flow distributing functions so that neither catalyst bypassing nor flow channeling can take place. The reaction product stream leaves the reactor 10 through the outlet connection 31 and is passed to apparatus, not shown, where it may be further treated for product recovery in the usual manner. The loss in pressure due to flow of the reactant material through the catalyst bed is about 10 p.s.i.

When gaseous reactant material is referred to in the above description and in the following claims, this term is intended to cover material in the gas phase and/or material in the vapor phase.

Although many changes can be made by those skilled in the art without departing from the scope of the invention, it is intended that all matter contained in the above description and appended claims and shown in the accompanying drawings shall be interpreted as illustrative and not limitative.

We claim:

1. A reactor vessel comprising a normally vertically disposed shell having a refractory insulating lining covering the internal surface thereof and defining a reaction zone, inlet means in the upper end of said vessel for flowing reactant material into said reaction zone, a permeable basket structure in said reaction zone adapted to be filled with and support a bed of subdivided contact material, said permeable basket structure of circular section and having an open bottom positioned on the bottom region of said lining, said basket structure spaced from said lining above said bottom region to provide for low resistance flow of the reactant material from said inlet means to all portions of the external surface of the supported bed of subdivided material above said bottom region, means positioned on said bottom region and opening into the space between said basket structure and said lining providing for low resistance flow of the reactant material to the external surface of the supported bed of subdivided material on said bottom region, reacted material outlet means in the lower end of said vessel including permeable means positioned centrally in said basket structure proportioned and arranged to provide flow paths thereto of substantially equal lengths from all portions of the external surface of the supported bed of subdivided material.

2. A reactor vessel comprising a normally vertically disposed shell having a refractory insulating lining covering the internal surface thereof and defining a reaction zone, inlet means in the upper end of said vessel for flowing reactant material into said reaction zone, a permeable basket structure in said reaction zone of circular section and having an open bottom positioned on the bottom region of said lining, a bed of subdivided contact material resting on said bottom region and contained in said basket structure, said basket structure spaced from said lining above said bottom region to provide for low resistance flow of the reactant material from said inlet means to all portions of the external surface of said bed of subdivided material contained therein, means positioned on said bottom region and opening into the space between said basket structure and said lining providing for low resistance flow of the reactant material to the bottom external surface of said bed of subdivided material on said bottom region, reacted material outlet means in the lower end of said vessel including permeable means positioned centrally in said bed of subdivided material proportioned and arranged to provide flow paths thereto of substantially equal lengths from all portions of the external surface of said bed of subdivided material.

3. A reactor vessel comprising a normally vertically disposed shell having a refractory insulating lining covering the internal surface thereof and defining a reaction zone, inlet means in the upper end of said vessel for flowing reactant material into said reaction zone, an open ended, cylindrical, permeable basket structure in said reaction zone positioned with its bottom open end on the bottom region of said lining, a bed of subdivided contact material resting on said bottom region and contained in said cylindrical basket structure, said cylindrical basket structure spaced from said lining to provide for low resistance flow of the reactant material from said inlet means to all portions of the top and cylindrical side external surfaces of said bed of subdivided material, means positioned on said bottom region and opening into the space between said basket structure and said lining providing for low resistance flow of the reactant material to the bottom external surface of said bed of subdivided material, reacted material outlet means in the lower end of said vessel including permeable means positioned centrally in said bed of subdivided material proportioned and arranged to provide flow paths thereto of substantially equal lengths from all portions of the external surfaces of said bed of subdivided material.

4. A reactor vessel comprising a normally vertically disposed shell having a refractory insulating lining covering the internal surface thereof and defining a reaction zone, inlet means in the upper end of said vessel for flowing reactant material into said reaction zone, an open ended, cylindrical, permeable basket structure in said reaction zone positioned with its bottom open end on the bottom region of said lining, a bed of subdivided solid contact material resting on said bottom region and contained in said cylindrical basket structure, a depth of subdivided inert material at the top end of said basket structure covering the top external surface of said bed, said depth of inert material being of sufficiently large particle size to offer low resistance to the flow of the reactants therethrough, said cylindrical basket structure spaced from said lining to provide for low resistance flow of the reactant material from said inlet means to all portions of the top and the cylindrical side external surfaces of said bed of subdivided material, means positioned on said bottom region and opening into the space between said basket structure and said lining providing for low resistance flow of the reactant material to the bottom external surface of said bed of subdivided material, reacted material outlet means in the lower end of said vessel including permeable means positioned centrally in said bed of subdivided material proportioned and arranged to provide flow paths thereto of substantially equal lengths from all portions of the external surfaces of said bed of subdivided material.

5. A reactor vessel comprising a normally vertically disposed shell having a refractory insulating lining covering the internal surface thereof and defining a reaction zone, inlet means in the upper end of said vessel for flowing reactant material into said reaction zone, an open ended, permeable, cylindrical basket structure positioned with its bottom open end on the bottom region of said lining, said basket structure formed by a plurality of vertical sections removably united along their contiguous edges, said sections having perforations therein distributed substantially uniformly over their entire surface, means carried by said sections spacing said basket structure from said lining to provide flow paths of low resistance for the reactant material to all portions of the external cylindrical surface of said basket structure, means positioned on said bottom region of said lining and opening into the space between said basket structure and said lining providing flow paths of low resistance for the reactant material to said bottom region of said insulating liner, and permeable outlet means positioned centrally in said basket structure.

6. A reactor vessel comprising a normally vertically disposed shell having a refractory insulating lining covering the internal surface thereof and defining a reaction zone, inlet means in the upper end of said vessel for flowing reactant material into said reaction zone, an open ended, cylindrical, permeable basket structure in said reaction zone positioned with its bottom open end on the bottom region of said lining, means spacing said cylindrical basket structure from said lining to provide low resistance paths for flow of the reactant material from said inlet means to all portions of the external cylindrical surfaces of said basket structure, radially disposed angle members positioned on said bottom region and extending through said basket structure and opening in the space between said lining and said basket structure to provide low resistance flow paths for the reactant material to said bottom region, reacted material outlet means in the lower end of said vessel including permeable means positioned centrally in said basket structure proportioned and arranged to provide flow paths thereto of substantially equal lengths from the top, side and bottom of said basket structure.

7. A reactor vessel comprising a normally vertically disposed shell having a refractory insulating lining covering the internal surface thereof and defining a reaction zone, inlet means in the upper end of said vessel for flowing reactant material into said reaction zone, an open ended, permeable cylindrical basket structure positioned with its bottom open end on the bottom region of said lining, said basket structure formed by a plurality of vertical sections removably united along their contiguous edges, said sections having perforations therein distributed substantially uniformly over their entire surface, means carried by said sections spacing said basket structure from said lining to provide flow paths of low resistance for the reactant material to all portions of the external cylindrical surface of said basket structure, radially disposed angle members positioned on said bottom region, extending through said basket structure and opening into the space between said basket structure and said lining to provide flow paths of low resistance for the reactant material to said bottom region of said insulating lining, and permeable outlet means positioned centrally in said basket structure proportioned and arranged to provide flow paths thereto of substantially equal length from the top, side and bottom of said basket structure.

8. A reactor vessel as defined in claim 7, in which a bed of subdivided solid material is positioned on said bottom region of said lining and supported in said basket structure, said radially disposed angle members are oriented with their open bases facing said bottom region and said bases are covered with foraminous material to thereby form said angles into conduits for passage of reactant material therethrough and substantially uniform distribution thereof into the subdivided solid material on said bottom region of said lining.

9. A reactor vessel as defined in claim 7, in which a bed of subdivided solid material is positioned on the bottom region of said lining and supported in said basket structure, said radially disposed angle members are oriented with their open bases facing said bottom region and said bases are covered with foraminous material to thereby form said angles into conduits for passage of reactant material therethrough and substantially uniform distribution thereof into the subdivided material on said bottom region of said lining, and the perforations in said basket sections are covered with foraminous material to prevent passage of subdivided material therethrough.

10. A reactor vessel as defined in claim 4, in which the centrally positioned permeable means of said material outlet means is a perforated cylindrical member positioned between the bottom and the top of said bed of subdivided solid material whose perforations are uniformly distributed.

11. A reactor vessel as defined in claim 4, in which the centrally positioned permeable means of said material outlet means is a perforated cylindrical member positioned between the bottom and the top of said bed of subdivided solid material, whose perforations are uniformly distributed and are covered by foraminous material to prevent passage of said subdivided solid material therethrough.

12. The process which comprises providing in a reaction zone a bed of subdivided solid material having a circular cross section and so disposed in said zone that all portions of its external surface are exposed to the entrance of reactant material, flowing gaseous reactant material into said reaction zone and distributing said material over substantially the whole external surface of said bed at substantially the same pressure, providing an outlet zone in the center of said bed, said outlet zone located and of a size that the flow paths of the reactant material thereinto from all portions of the external surface of said bed are of substantially equal length, flowing the reactant material through said flow paths to said outlet zone, and removing the reactant material from said outlet zone.

13. The process of converting hydrocarbon which comprises, providing in a reaction zone a bed of subdivided solid catalyst material having a circular cross section and so disposed in said zone that all portions of its external surface are exposed to the entrance of reactant material, flowing gaseous hydrocarbon reactant material at temperature and pressure suitable for reaction into said reaction zone and distributing the incoming gaseous hydrocarbon material over substantially the whole external surface of said bed while maintaining a substantially uniform pressure over the whole of said external surface, providing an outlet zone at the center of said bed for flow of reacted hydrocarbon material therein, said outlet zone located and of a size that the flow paths of the gaseous reactant hydrocarbon material thereinto from all portions of the external surface of said bed are of substantially equal length, flowing the reactant hydrocarbon material through said paths into said outlet zone, and removing the reacted hydrocarbon material from said outlet zone.

14. The process of reforming hydrocarbon oils which comprises, providing in a reaction zone a bed of subdivided, solid, hydrogenating-dehydrogenating catalyst material having a circular cross section and so disposed in said zone that all portions of its external surface are exposed to the entrance of gaseous reactant material, flowing gaseous hydrocarbon oil reactant material at temperature and pressure suitable for reaction into said reaction zone and distributing the incoming gaseous hydrocarbon oil reactant material over substantially the whole external surface of said bed while maintaining a substantially uniform pressure over the whole of said external surface, providing an outlet zone at the center of said bed for flow of reacted hydrocarbon oil material therein, said zone located and of a size that the flow paths of the gaseous hydrocarbon oil reactant material thereinto from all portions of the external surface of said bed are of substantially equal length, flowing the gaseous hydrocarbon oil reactant material through said flow paths to said outlet zone, and removing the reacted hydrocarbon material from said outlet zone.

15. The process of reforming light hydrocarbon oils in the presence of hydrogen which comprises, providing in a reaction zone a bed of subdivided, solid, hydrogenating-dehydrogenating catalyst material having a circular cross section and so disposed in said zone that all portions of its external surface are exposed to the entrance of gaseous reactant material, flowing gaseous light hydrocarbon oil and hydrogen reactant material at temperature and pressure suitable for reaction into said reaction zone and distributing the incoming gaseous light hydrocarbon oil and hydrogen reactant material over substantially the whole external surface of said bed while maintaining a substantially uniform pressure over the whole of said external surface, providing an outlet zone at the center of said bed for flow of reacted material therein, said zone located and of a size that the flow paths thereinto from all portions of the external surface of said bed are of substantially equal length, flowing said gaseous light hydrocarbon oil and hydrogen reactant material through said flow paths to said outlet zone, and removing the reacted material from said outlet zone.

16. The process of reforming light hydrocarbon oils in the presence of hydrogen which comprises, providing in a reaction zone a bed of subdivided solid, platinum catalyst material having a circular cross section and so disposed in said zone that all portions of its external surface are exposed to the entrance of gaseous reactant material, flowing gaseous light hydrocarbon oil and hydrogen reactant material at temperatures ranging from about 700° F. to 1075° F. and pressures ranging from 25 p.s.i.g. to 1000 p.s.i.g. into said reaction zone and distributing the incoming gaseous light hydrocarbon oil and hydrogen reactant material over substantially the whole external surface of said bed while maintaining a substantially uniform pressure over the whole of said external surface, providing an outlet zone at the center of said bed for flow of reacted material therein, said zone located and of a size that the flow paths thereinto from all portions of the external surface of said bed are of substantially equal length, flowing said gaseous light hydrocarbon oil and hydrogen reactant material through said flow paths to said outlet zone, and removing the reacted material from said outlet zone.

References Cited in the file of this patent

UNITED STATES PATENTS

| | | |
|---|---|---|
| 2,317,449 | Flock | Apr. 27, 1943 |
| 2,363,738 | Mather et al. | Nov. 28, 1944 |
| 2,369,478 | Mekler et al. | Feb. 13, 1945 |
| 2,483,923 | Morrey | Oct. 4, 1949 |
| 2,578,704 | Houdry | Dec. 18, 1951 |
| 2,634,194 | Nebeck | Apr. 7, 1953 |
| 2,683,654 | Bergman | July 13, 1954 |